United States Patent
Shaffer et al.

(10) Patent No.: US 6,587,553 B1
(45) Date of Patent: Jul. 1, 2003

(54) METHOD AND APPARATUS FOR PROTECTING CALL PRIVACY

(75) Inventors: Shmuel Shaffer, Palo Alto, CA (US); William J. Beyda, Cupertino, CA (US)

(73) Assignee: Siemens Information & Communications Networks, Inc., Boca Raton, FL (US)

( * ) Notice: Subject to any disclaimer, the term of this patent is extended or adjusted under 35 U.S.C. 154(b) by 0 days.

(21) Appl. No.: 09/211,994

(22) Filed: Dec. 14, 1998

(51) Int. Cl.[7] .............................. H04M 3/00; H04M 3/42
(52) U.S. Cl. .................................... 379/188; 379/201.01
(58) Field of Search .............................. 379/201, 188, 379/189, 190, 191, 192, 193, 194, 195, 196, 197, 198, 199, 200, 210, 211, 212, 202

(56) References Cited

U.S. PATENT DOCUMENTS

| 5,319,702 A | * | 6/1994 | Kitchin et al. ............... 379/189 |
| 5,521,969 A | * | 5/1996 | Paulus et al. ................ 379/142 |
| 5,568,540 A | | 10/1996 | Greco et al. ................... 379/89 |
| 5,579,383 A | * | 11/1996 | Bales et al. .................. 379/212 |
| 5,615,253 A | * | 3/1997 | Kocan et al. ................. 379/196 |
| 5,742,596 A | | 4/1998 | Baratz et al. ................ 370/356 |
| 5,926,533 A | * | 7/1999 | Gainsboro .................... 379/188 |
| 5,995,607 A | * | 11/1999 | Beyda et al. ................. 379/202 |

* cited by examiner

*Primary Examiner*—Ahmad F. Matar
*Assistant Examiner*—Hector Agdeppa

(57) ABSTRACT

A method and an apparatus for protecting call privacy allow a calling party to control the privacy of a telephone call by selecting among a group of privacy options that represent varying degrees of privacy and enforcing the selected privacy options during the call. The privacy options selected for the call limit the ability of a called party to manipulate the call. For example, the privacy options may prevent the called party from forwarding the call, transferring the call, conferencing the call, and/or listening to the call via a hands-free speakerphone. In an additional aspect of the invention, the selected privacy options are transferred to any voicemail messages that are generated as a result of the call made by the calling party. The preferred call privacy system is implemented in a packet-based network that carries voice and data.

15 Claims, 3 Drawing Sheets

METHOD AND APPARATUS FOR PROTECTING CALL PRIVACY

BACKGROUND OF THE INVENTION

The invention relates to telecommunications systems, and more particularly to insuring the privacy of communications made via a telecommunications system.

DESCRIPTION OF THE RELATED ART

Privacy is an important issue for many users of telecommunications equipment. The issue relates to ensuring that only the intended parties in a conversation carried over a particular telecommunications system are connected to receive the voice information. Privacy is of particular concern in corporate environments where multifunction telephone systems allow calls to be forwarded, transferred, or conferenced. For example, the privacy of a telephone call can be breached when a calling party A believes it has contacted party B but the call has unknowingly been forwarded or transferred to party C. Because the calling party A is unaware that it has contacted the wrong party, calling party A may provide information to party C that is not intended for party C. In another example, the calling party A may not want certain sensitive information to be heard by other parties within earshot of the called party B. However, without the calling party's knowledge, the called party may conduct its end of the conversation through a hands-free speakerphone which projects the conversation to the surrounding environment, potentially breaching the privacy of the call.

Many of the same privacy concerns related to real-time telephone conversations exist with respect to voice messaging systems that are commonplace in multifunction telephone systems. For example, in most messaging systems a voicemail message intended to be heard only by a particular party may be call forwarded to unintended parties or overheard when an intended party listens to the message using a speakerphone with unintended parties within earshot. A privacy feature which prevents voicemail messages, identified as private, from being forwarded or copied has been added to some messaging systems and is described in U.S. Pat. No. 5,568,540 entitled "Method and Apparatus for Selecting and Playing a Voicemail Message," issued to Greco et al. (hereinafter Greco). Although the privacy feature works well for its intended purpose, the feature of Greco is limited to preventing a specifically marked voicemail message from being forwarded or copied to anyone but the intended recipient. Greco does not provide any other privacy options, such as protection against a message being overheard during replay via a speakerphone.

In view of the privacy concerns involved with telephone communications and in view of the limited privacy controls available in telephone systems, what is needed is a voice communications approach that offers improved privacy functions.

SUMMARY OF THE INVENTION

Methods and an apparatus for protecting call privacy allow a calling party to control the privacy of a telephone call by selecting among a group of privacy options that represent varying degrees of privacy and by enforcing the selected privacy options during the call. The privacy options selected for the call limit the ability of a called party to manipulate the call. For example, the privacy options may prevent the called party from forwarding the call, transferring the call, conferencing the call, and/or listening to the call via a hands-free speakerphone. Allowing the calling party to control how freely the called party can manipulate an incoming call helps to ensure that the calling party's privacy expectations are met. In an additional aspect of the invention, the selected privacy options are transferred to any voicemail message that is generated as a result of the call made by the calling party.

In a preferred embodiment, the call privacy system is embodied in a telephony-over-local area network (LAN), or ToL, communications system that enables real-time voice conversations over a packet-based network such as a LAN. The preferred ToL system includes communications nodes, and optionally a telephony server and a data server. The communications nodes may consist of a computer and a telephone which are connected to each other and to the LAN. Each computer is preferably equipped with a telephony programming application interface (TAPI) that allows the computers to be used for telephony functions, such as call placement. The telephones are preferably digital telephones that are compatible with computer telephony protocols. The telephony server connected to the LAN provides the computer telephony functionality for the ToL system. The telephony functionality includes managing call control between the communications nodes and potentially with a PSTN via a ToL gateway. In a preferred embodiment, the telephony server includes a messaging system with voicemail capability. As an alternative embodiment, the messaging system may be encompassed in other devices. The optional data server may provide access to traditional database information, such as financial records, manufacturing schedules, and/or customer information. In the preferred system, data and voice information is passed between the communications nodes and/or the servers through the same communications network. The communications nodes and telephony server are configured to provide extended caller-initiated privacy options within the ToL network. Although various other privacy options may be implemented, preferred caller-initiated privacy options include preventing a call from being forwarded, transferred, or conferenced, and preventing a call from being conducted using a speakerphone of the called party. Additional caller-initiated privacy options include preventing voicemail messages from being forwarded, transferred, or conferenced, and preventing voicemail messages from being amplified for replay using a speakerphone.

In the preferred embodiment, a calling party initiates a call via a call placement screen that is configured to display the available privacy options, the call placement screen may be part of a call placement software application that is resident in the computers of the communications nodes. The call placement screen includes many traditional call control buttons, such as a standard telephone keypad, a dial button, and a display of the number to dial. The call placement screen may also include feature buttons such as redial, conference, hold, speaker, and transfer buttons that activate the corresponding functions. In the preferred embodiment, the call placement screen also includes a privacy button and individually selectable privacy options. The individually selectable privacy options include block-call-forwarding, block-call-transferring, block-call-conferencing, and block-speakerphone-use. A calling party can select a particular privacy option or a combination of privacy options by, for example, directing a cursor to a desired selection box and clicking a mouse or equivalent device.

A preferred operation of the caller-initiated privacy system is described for a calling party A that wishes to place a call to a called party B. To initiate the call, the calling party A accesses a call placement screen via a communications node. The calling party A then identifies the called party B by entering the number (i.e., the extension number) of the called party. The calling party A then has the option of selecting among any combination of privacy options that are displayed on the call placement screen. Once the caller-initiated privacy options are selected, the call placement application generates and transmits a call setup protocol message that identifies the selected privacy options. After call setup is complete, the call is initiated and the called party B receives the call that has been established within the parameters dictated by the selected call privacy options.

During the call, the selected call privacy options are enforced by the telephony server and the respective communications nodes. In the preferred embodiment, the block-call-forwarding, transferring, and conferencing options are enforced via the telephony server, because the telephony server coordinates all the telephony functions. The block-speakerphone-use option is enforced by cooperation between the communications nodes and the telephony server. That is, the communications nodes are programmed to request permission from the telephony server to activate a speakerphone at a communications node. A request to activate a speakerphone will be denied if the block-speakerphone-use option is active on the particular call. In the preferred embodiment, enforcement of the selected privacy options is transferred to any message, such as a voicemail message, that is generated in response to the present call.

Although the techniques of providing multiple caller-initiated privacy options are described with reference to a packet-switched LAN, the caller-initiated privacy options can be implemented in circuit-switched telephone networks that utilize, for example, a private branch exchange (PBX) and/or a central office.

DETAILED DESCRIPTION

Figure 1:
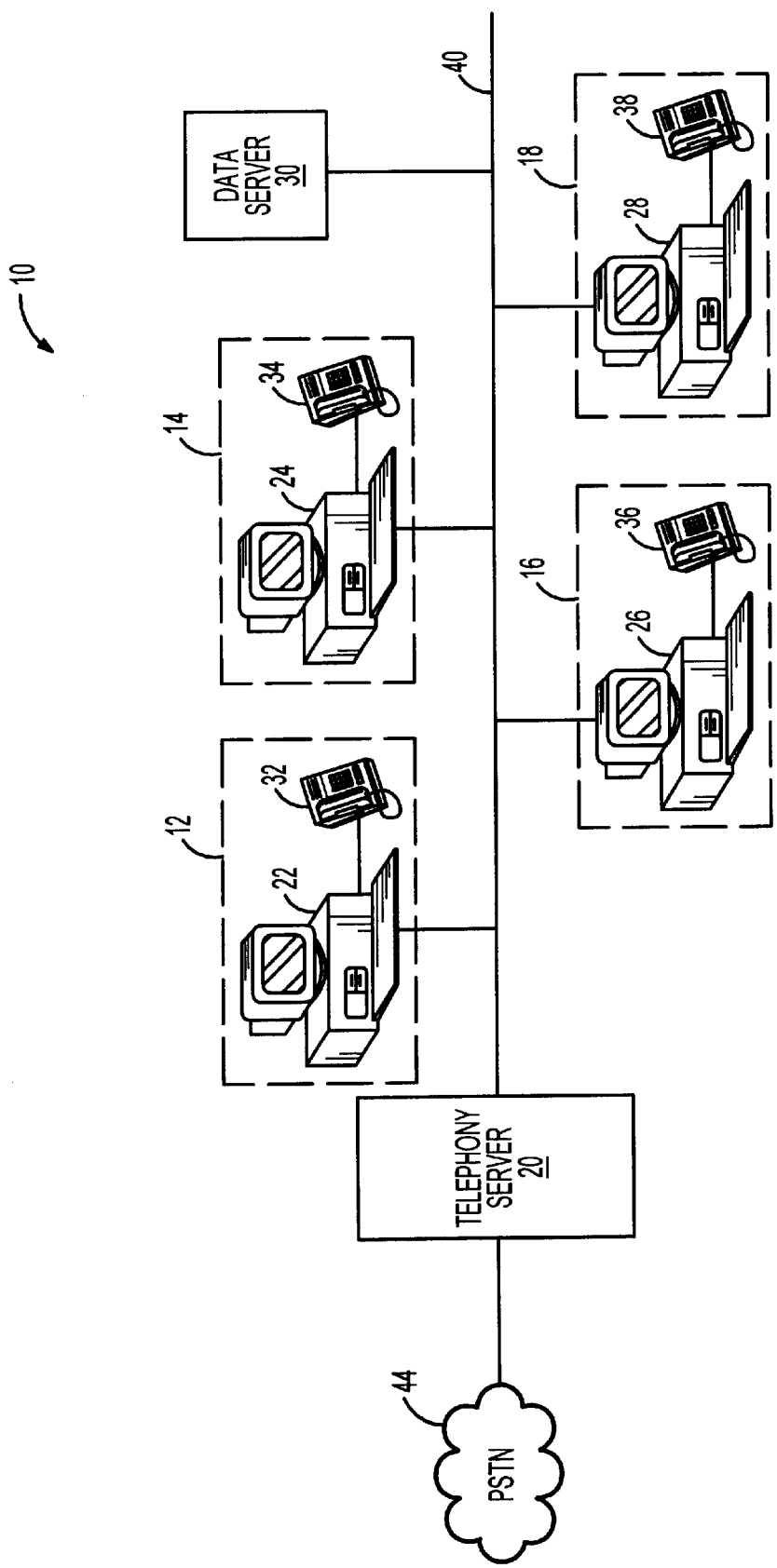
FIG. 1 is a depiction of a telephony-over-LAN system configured to provide privacy options in accordance with a specific embodiment of the invention.

FIG. 1 is a depiction of a system 10 that can be configured to operate in accordance with a specific embodiment of the invention. The preferred system is a telephony-over-local area network (LAN) 40, or ToL, system that includes communications nodes 12, 14, 16, and 18, a telephony server 20, and optionally a data server 30. The system simultaneously transfers non time-critical data (such as e-mail) and time-critical data (such as voice communications) over a packet-switched network using conventional techniques.

The communications nodes 12–18 in the integrated voice and data network system of FIG. 1 preferably consist of computers 22, 24, 26, and 28 and telephones 32, 34, 36, and 38, all of which are connected to the LAN 40. The computers are conventional computers that are configured to enable communications over the LAN. Each computer is preferably equipped with a telephony programming application interface (TAPI) that allows the computer to be used for telephony functions such as call placement. The telephones are preferably digital telephones that are compatible with computer telephony protocols, although analog telephones can be used. Although the telephones are shown as connected to the LAN through the computers, the telephones can alternatively be connected directly to the LAN.

In the specific embodiment, the telephony server 20 connected to the LAN 40 provides the computer telephony functionality as a gatekeeper for the ToL system 10. The functionality includes managing call control between the communications nodes 12–18. In a preferred embodiment, the telephony server also provides a messaging system, such as a voicemail system, although the messaging system may be encompassed in other devices. The telephony server also can act as a gateway to a broader telephone network, such as a PSTN 44, in some embodiments. In other embodiments, the gateway functionality may be located separately from ToL server 20 in a hardware gateway. The broader telephone network may be a circuit-switched network, but a broader packet-based network can be integrated into the system.

The data server 30 is optionally connected to the LAN 40 to provide traditional data accessibility. The data server may contain information such as financial records, manufacturing schedules, and/or customer information. Although not shown, the LAN may also be connected to additional systems that provide, for example, network control and/or access to broader data networks such as the Internet.

The above-described communications nodes 12–18 and telephony server 20 are configured to provide extended caller-initiated privacy options within the ToL network. The caller-initiated privacy options that are the focus of the invention include preventing a call from being forwarded, transferred, or conferenced, and preventing a call from being conducted through a speakerphone of the called party. Additional caller-initiated privacy options include preventing voicemail messages from being forwarded, transferred, or conferenced, and preventing voicemail messages from being listened to over a speakerphone.

All of the privacy options are provided to ensure that an intended party is the only party that receives the private information. Although specific privacy options are disclosed and described in detail below, other privacy options may be implemented into the system. It should be noted that "privacy" as used herein refers to subject matter that is separate from the issues of network security, and particularly telecommunications security. Telecommunications security is related to preventing the unauthorized intrusion into a communications network, while privacy is related to insuring that only the intended parties are involved in an information exchange where unauthorized intrusion is not a primary issue. Security is typically considered at a network level, while privacy is a main consideration at an individual level.

The operation of the privacy system, in addition to various examples and alternatives, is described below. The privacy options are preferably integrated into a ToL system 10, with implementation into computer-based call placement screens and ToL call setup protocols.

Figure 2:
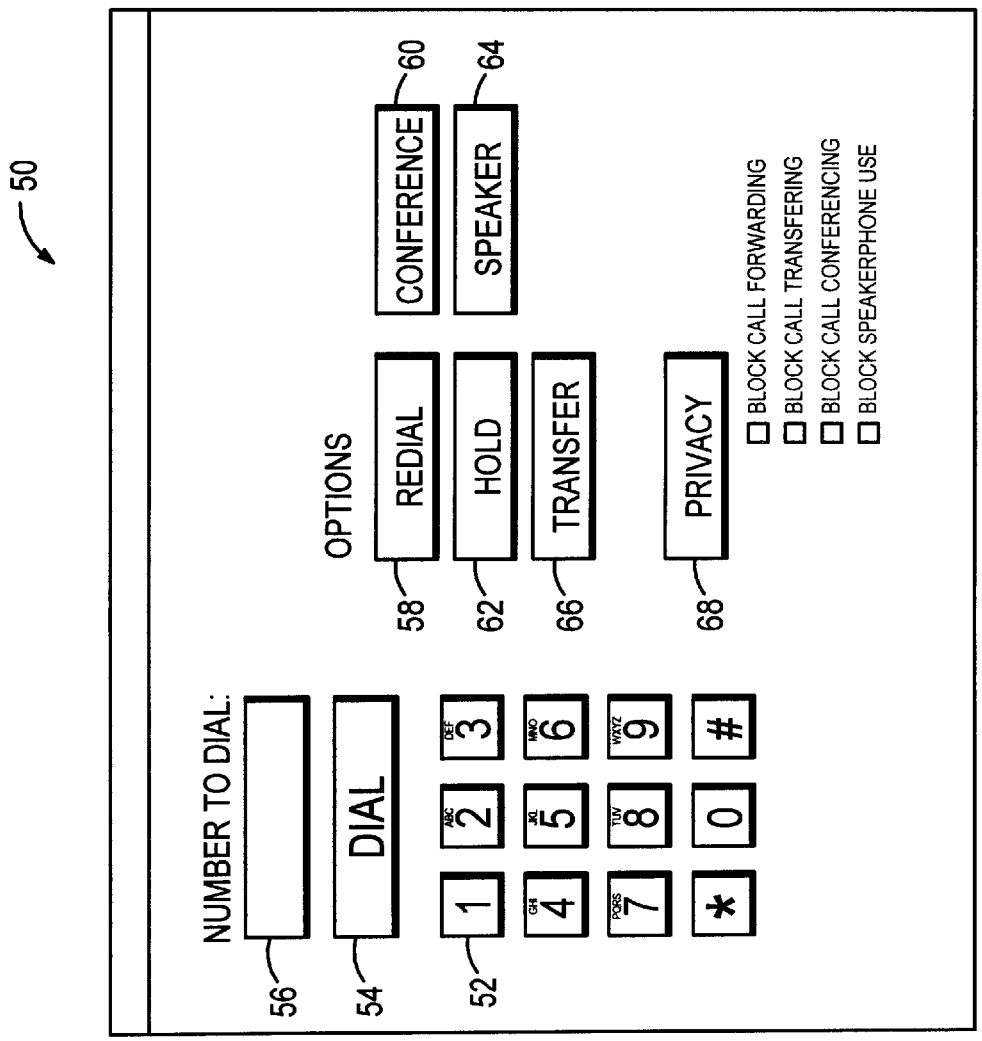
FIG. 2 is a depiction of a preferred call placement screen that is configured to provide privacy options in accordance with a specific embodiment of the invention.

FIG. 2 is a depiction of a preferred call placement screen 50 that is configured to implement the privacy options of the specific embodiment of the invention. In the preferred embodiment, the call placement screen 50 is part of a call placement application that is resident in each of the computers 22–28 of the communications nodes 12–18. The call placement screens include many traditional call control buttons, such as a standard telephone keypad 52, a dial button 54, and a display of, for example, the number to dial 56. The call placement screens may also include option buttons, such as redial 58, conference 60, hold 62, speaker 64, and transfer 66 buttons that activate the corresponding functions.

In a preferred embodiment, the call placement screens also include a privacy button 68 and individually selectable privacy options. The individually selectable privacy options in the preferred embodiment include: block-call-forwarding, block-call-transferring, block-call-conferencing, and block-speakerphone-use. Although four specific privacy functions are described, other privacy functions may be integrated into the privacy system and the call placement screen. A calling party can select a particular privacy option by, for example, directing a cursor to a desired privacy option selection box and clicking a computer mouse button. Alternatively, call placement options can be accessed through an interface integrated with the telephone.

Figure 3:
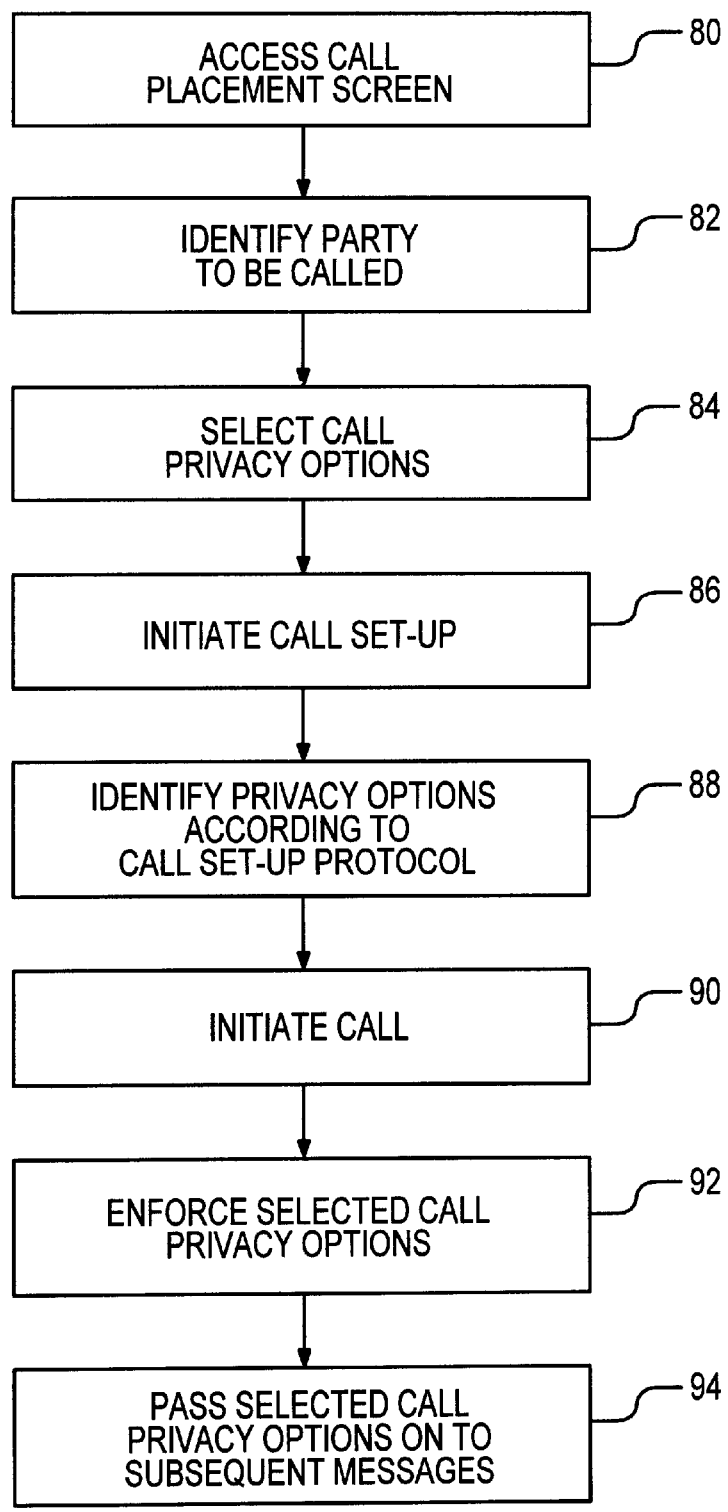
FIG. 3 is a process flow diagram of a method for implementing privacy options in accordance with specific embodiments of the invention.

According to specific embodiments of the present invention, a preferred operation of the caller-initiated privacy system is described with reference to FIGS. 2 and 3 for a calling party A that wishes to place a call from a calling device to a called party B at a called device. To initiate a call in step 80, the calling party A accesses the call placement screen 50 via its communications node. The calling party A then identifies the called party B in step 82 by entering, for example, the number (i.e., the extension number) or name of the called party B. The calling party A has the option in step 84 of selecting among any combination of the four privacy options that are displayed on the call placement screen. Once the caller-initiated privacy options are selected, the call placement application initiates a call setup protocol message that identifies the selected privacy options, as shown in steps 86 and 88. In a ToL system, call setup may involve placing a setup message in a new field of a call setup command as described in, for example, the H.323 or H.450.X telephony protocols. After call setup is complete, the call is initiated at step 90 and the called party B receives the call that has been set up with the selected privacy options.

During the call, the selected privacy options are enforced in step 92 by the telephony server and the respective communications nodes. In the preferred embodiment, the block-call-forwarding, transferring, and conferencing options are enforced via the telephony server, because the telephony server coordinates all of the telephony functions. The block-speakerphone-use privacy option is enforced by cooperation between the communications nodes and the telephony server. That is, the communications nodes are programmed to request permission from the telephony server to activate a speakerphone at a communications node. A request to activate a speakerphone will be denied if the block-speakerphone-use privacy option is active on the particular call. Alternative embodiments enforce speakerphone use locally at each communications node.

In the specific example of calling party A initiating a call with called party B, the four privacy options are described separately in further detail. The block-call-forwarding privacy option prevents a call from being forwarded from one communications node to another. For example, party B may set up its telephone so that incoming calls are automatically forwarded to an administrator while party B is in a meeting. This may pose a privacy breach if calling party A believes it has contacted called party B, when in reality the call has been forwarded to the administrator for party B. With the, block-call-forwarding function selected, calling party A's call will not be forwarded as directed by called party B, or calling party A will be notified that the call has been forwarded and given the opportunity to end the call before call privacy is jeopardized.

The block-call-transferring privacy option prevents the call of calling party A from being transferred by called party B. For example, some systems normally allow the call of party A to be transferred by party B to a third party without agreeing to be transferred and without the knowledge of party A. With the block-call-transferring option selected, the calling party can better control whether or not the call is transferred to another communications node.

The block-call-conferencing privacy option prevents calling party A from being conferenced into a multiparty call that includes a party other than the intended party. For example, called party B may try to conference a third party into a conversation between parties A and B without party A's knowledge. The block-call-conferencing option will prevent this possible breach of privacy. In an alternative embodiment of this function, the system can be configured to prevent call monitoring that is often performed at call distribution centers to, for example, monitor employee performance. That is, if calling party A initiates a call with party B and the call is being monitored by a third party, party A will either be notified of the third party's presence or the call will be cancelled.

The block-speakerphone-use privacy option prevents called party B from conducting a call initiated by party A through a hands-free speakerphone. For example, when the block-speakerphone-use option is initiated by calling party A, called party B will not be able to answer the incoming call with a speakerphone or switch the call to the speakerphone during the conversation. This privacy function allows the calling party to prevent the conversation from being overheard by anyone within earshot of party B's speakerphone. In an environment where many workers are located in close quarters, this feature can prevent inadvertent breaches of privacy.

In addition to applying the caller-initiated privacy options to a real-time voice communication between parties, in step 94 according to another specific embodiment the caller-initiated privacy options can be automatically transferred to subsequent voicemail and/or multimedia messages that are generated in relation to a call. For example, when a call is initiated with certain privacy options selected, all of the selected privacy options are passed on to any message that is left for the called party. Specifically, if a call is initiated with the block-call-forwarding privacy option selected, then a subsequent message is prevented from being forwarded to other voicemail boxes within the communications system. Additionally, if a call is initiated with the block-speakerphone-use privacy option selected, then a message left as a result of the call is prevented from being broadcast through a speakerphone, regardless of when the message is played. Enabling a user to prevent messages from being played aloud via a speakerphone is important because the calling party will not otherwise have any control over privacy when the called party accesses the message. In the above-described examples, the selected privacy options are transferred to a message that is generated in response to a telephone call that is not answered. In another embodiment, the privacy options can be similarly applied to a message that is pre-recorded by a sending party and then delivered to the voicemail box of a receiving party without attempting to make direct party-to-party contact.

Although the techniques of providing multiple caller-initiated privacy options are described above with reference to a packet-switched telephone network, the caller-initiated privacy options can be implemented in circuit-switched telephone networks that utilize, for example, a private branch exchange (PBX) and/or a central office (CO) in accordance with other specific embodiments. In circuit-switched telephone networks, feature codes (i.e., *54) and/or preprogrammed feature buttons can be used to activate particular privacy options related to a call or a message. In an alternative embodiment, a menu-driven telephone can be used to select different privacy options. When implementing multiple call privacy options in a PBX-based telephone system, call setup procedures may vary from the ToL systems. Specifically, call privacy options may be identified in proprietary signaling fields, standard fields, and/or ISDN user-to-user fields.

In other alternative embodiments, the privacy options may be configured to allow expanded access to call-related information. For example, a privacy option may allow a call to be transferred, but only to certain parties. Specifically, the block-call-transfer option could be configured to allow a call to be transferred within a particular department (i.e., the sales department), but not to other departments (i.e., the accounting department), thereby preserving the privacy of information within a limited group. In another alternative embodiment, the call privacy options can be applied separately to either a call or a message.

An advantage of the invention is that the privacy of a telephone call and/or a message can be controlled by a caller. Another advantage is that a caller can select from various levels of privacy, depending on the particular privacy needs of the caller.

What is claimed is:

1. A method for protecting call privacy comprising the steps of:
    initiating a process for establishing a call between a calling device and a called device;
    selecting among a plurality of privacy options that are to be assigned to said call between said calling device and said called device, including selecting a privacy option that blocks call monitoring of said call from a third device and including using said calling device by a calling party to identify selected privacy options prior to establishing said call, each of said privacy options being associated with a limitation on call compatibility at said called device;
    following said selecting, establishing call connectivity between said calling and called devices including assigning each said selected privacy option to said call between said calling device and said called device; and
    enforcing each said selected privacy option during said call between said calling device and said called device, said enforcing being responsive to said step of selecting from among said privacy options by said calling party.

2. The method of claim 1 wherein said step of enforcing includes disabling call control capability of said called device based on said selected privacy options, said disabling being implemented via operation of a telephony server.

3. The method of claim 2 wherein said step of selecting includes selecting a privacy option that prevents call forwarding, said step of enforcing including disabling call forwarding of said call to a third call device.

4. The method of claim 2 wherein said step of selecting includes selecting a privacy option that prevents call transferring, said step of enforcing including disabling call transfer of said call to a third call device.

5. The method of claim 2 wherein said step of selecting includes selecting a privacy option that prevents call conferencing, said step of enforcing including disabling call conferencing of said call with a third device.

6. The method of claim 1 further including steps of:
    transferring assignment of said selected privacy options to a message that is generated and stored as a result of said call between said called device and said calling device; and
    enforcing said selected privacy options during subsequent manipulation of said message.

7. The method of claim 6 wherein said step of selecting among a plurality of privacy options includes a step of selecting any combination of privacy options, wherein said privacy options include preventing call and message forwarding, preventing call and message transferring, and preventing a call and message from being listened to through a speakerphone.

8. The method of claim 6 wherein said call between said calling device and said called device is conducted over a packet-based network.

9. The method of claim 8 wherein said step of assigning includes a step of identifying said selected privacy options in an H.323 command.

10. A method for protecting the privacy of voice data comprising:
    providing a telecommunications system which is configured to enforce privacy options that are selected on a call-by-call basis in which said selections for successive calls are indicated after each said call is initiated and before call connectivity is established for said each call, said selecting and enforcing being on said call-by-call basis and including for each said call the steps of:
    (1) selecting said privacy options from among a plurality of said privacy options that can be assigned to voice data transferred over a network, said selecting being executed by a person from whom said voice data is to originate and occurring prior to establishing said call connectivity of said call to which said selected privacy options are to be applied;
    (2) providing connectivity of said call to which said selected privacy options are to be applied;
    (3) assigning said selected privacy options to said voice data that is transferred over said network; and
    (4) preventing said voice data from being manipulated by a called party after receiving said call if manipulations would be in conflict with said selected privacy options as a response to said step of selecting said privacy options by said person from whom said voice data is to originate.

11. The method of claim 10 further including a step of transferring said voice data over said network from a calling device to a called device as part of a real-time voice communication, said privacy options being related to disabling available call-control capabilities at said called device.

12. The method of claim 11 wherein said step of selecting includes a step of selecting among at least two privacy options, wherein said at least two privacy options are from the group consisting of: preventing call forwarding, preventing call transferring, preventing call conferencing, and preventing speakerphone use.

13. The method of claim 10 wherein said step of selecting includes selecting a privacy option that prevents said voice data from being listened to via a hands-free speaker.

14. A method for protecting call privacy comprising the steps of:
    initiating a process for establishing a call between a calling device and a called device;

selecting a specific privacy option from among a plurality of privacy options that are to be assigned to said call between said calling device and said called device, wherein said specific privacy option prevents said call between said calling device and called device from being directed through a hands-free speakerphone that is related to said called device, including using said calling device by a calling party to identify said specific privacy option prior to establishing said call, each of said privacy options being associated with a limitation on call compatibility at said called device;

following said selecting, establishing call connectivity between said calling and called devices, including assigning said specific privacy option to said call between said calling device and said called device; and enforcing each said specific privacy option during said call between said calling device and said called device, said enforcing being responsive to said step of selecting from among said privacy options by said calling party;

wherein said step of enforcing includes disabling call control capability of said called device based on said selected specific privacy option, said disabling being implemented via operation of a telephony server.

15. A method for protecting call prvacy comprising the steps of:

initiating a process for establishing a call between a calling device and a called device;

selecting any combination of a plurality of privacy options that are to be assigned to said call between said calling device and said called device, including using said calling device by a calling party to identify selected privacy options prior to establishing said call, each of said privacy options being associated with a limitation on call compatibility at said called device, said privacy options including preventing call forwarding, preventing call transferring, preventing call conferencing, and preventing speakerphone use at said called device;

following said selecting, establishing call connectivity between said calling and called devices, including assigning each said selected privacy option to said call between said calling device and said called device; and enforcing each said selected privacy option during said call between said calling device and said called device, said enforcing being responsive to said step of selecting from among said privacy options by said calling party.

* * * * *